(12) United States Patent
Khalil et al.

(10) Patent No.: US 7,257,402 B2
(45) Date of Patent: Aug. 14, 2007

(54) METHOD AND APPARATUS FOR MANAGING A PLURALITY OF MOBILE NODES IN A NETWORK

(75) Inventors: Mohamed Khalil, Murphy, TX (US); Haseeb Akhtar, Garland, TX (US); Emad Qaddoura, Plano, TX (US); Raja Narayanan, Plano, TX (US)

(73) Assignee: Nortel Networks Limited, St. Laurent, Quebec (CA)

(*) Notice: Subject to any disclaimer, the term of this patent is extended or adjusted under 35 U.S.C. 154(b) by 368 days.

(21) Appl. No.: 10/240,085

(22) PCT Filed: Mar. 27, 2001

(86) PCT No.: PCT/US01/09858

§ 371 (c)(1),
(2), (4) Date: Sep. 26, 2002

(87) PCT Pub. No.: WO01/72110

PCT Pub. Date: Oct. 4, 2001

(65) Prior Publication Data

US 2003/0060199 A1 Mar. 27, 2003

(51) Int. Cl.
*H04Q 7/20* (2006.01)

(52) U.S. Cl. ............... 455/435.1; 455/432.1; 455/433

(58) Field of Classification Search .......... 455/445, 455/433, 422, 550.1, 466, 435.1, 432.1; 370/338
See application file for complete search history.

(56) References Cited

U.S. PATENT DOCUMENTS

| | | | |
|---|---|---|---|
| 5,943,620 A * | 8/1999 | Boltz et al. ............. | 455/445 |
| 6,456,857 B1 * | 9/2002 | Bos et al. ............... | 455/550.1 |
| 6,563,919 B1 * | 5/2003 | Aravamudhan et al. .... | 379/230 |
| 7,130,629 B1 * | 10/2006 | Leung et al. ............ | 455/435.1 |
| 2002/0003789 A1 * | 1/2002 | Kim et al. .............. | 370/338 |

OTHER PUBLICATIONS

W 99/17521; Apr. 8, 1999; Scotto Di Carlo, Schulz, Egon. Networks, Users and Terminals in UMTS/FPLMTS; Benard-Dende, J. C. et al.; Vehicular Technology Conference, 1994 IEEE 44th Stockholm, Sweden, Jun. 8-10, 1994, New York, NY, USA, IEEE, Jun. 8, 1994, pp. 681-685.

* cited by examiner

*Primary Examiner*—Duc M. Nguyen
*Assistant Examiner*—Wayne Cai
(74) *Attorney, Agent, or Firm*—Carr LLP

(57) ABSTRACT

A method and apparatus for allowing a plurality of mobile nodes to access a network with one or more Network Access Identifiers (NAIs), This allows a user to access a network with multiple mobile nodes using a single NAI. The method and apparatus is achieved by the addition of a Session/Device Extension, a Host Identification Extension, a Host Identification NAI Extension, and/or a Lease Time Extension.

20 Claims, 4 Drawing Sheets

METHOD AND APPARATUS FOR MANAGING A PLURALITY OF MOBILE NODES IN A NETWORK

TECHNICAL FIELD

The invention relates to network routing and, more particularly, to selectively directing messages to one or more network access devices of a user, such as a mobile phone or pager, in addition to or instead of a primary network access device, such as a laptop or desktop terminal.

BACKGROUND

As the number of network access devices, such as cell phones, pagers, hand-held devices, and the like available to users grows, so does the need to direct network messages to those devices. Such networks include, for example, all or a portion of the Internet world-wide network of computers, LAN, MAN, WAN, and similar networks. A typical user could utilize a variety of network Access devices through which messages can be sent to or received from others, depending upon the location and convenience of the device to the user. Though U.S. Pat. No. 5,943,620 to Holtz et al, WO 99 17521 A to Schulz et al, and Renard-Dendo et al: "Networks, Users, and Terminals in UMTS/FPLMTS," *Vehicular Technology Conference,* 1994, IEEE, disclose a wireless network with message routing performed on the basis of the location of a wireless device, these references do not disclose the claimed invention. In order for a user to send and receive messages conveniently and without undue delay, a need exists for managing and controlling the routing of messages to and from the network access devices selected by the user.

SUMMARY

The present invention provides a management and control system for directing network messages to and from one or more network access devices of a user. Access to the network is obtained by registration of the device with the network. Messages may then be sent by the user from the registered network access device through the network. Other network nodes sending a message to the network address of the user receive a transmission of one or more addresses specifically identifying one or more of the network access devices of the user to which messages sent by the other network nodes are specifically addressed.

In one aspect of the invention, the user specifies which of the network access devices are to be directed messages.

In another aspect of the invention, the user specifies which of the network access devices should be directed messages from other network nodes at a specified time or according to a schedule.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

In the following discussion, numerous specific details are set forth to provide a thorough understanding of the present invention. However, it will be obvious to those skilled in the art that the present invention may be practiced without such specific details. In other instances, well-known elements have been illustrated in schematic or block diagram form in order not to obscure the present invention in unnecessary detail. Additionally, for the most part, details concerning network communications and the like have been omitted inasmuch as such details are not considered necessary to obtain a complete understanding of the present invention, and are considered to be within the skills of persons of ordinary skill in the relevant art.

It is noted that Request for Comments (RFC) documents referenced herein are available from the Internet Engineering Task Force (IETF), including the IETF Internet web page.

It is further noted that, unless indicated otherwise, all functions described herein are performed by a processor such as a computer or electronic data processor in accordance with code such as computer program code, software, and/or integrated circuits that are coded to perform such functions.

The principles of the present invention and their advantages are best understood by referring to the illustrated embodiment depicted in FIGS. 1-6.

Figure 1:
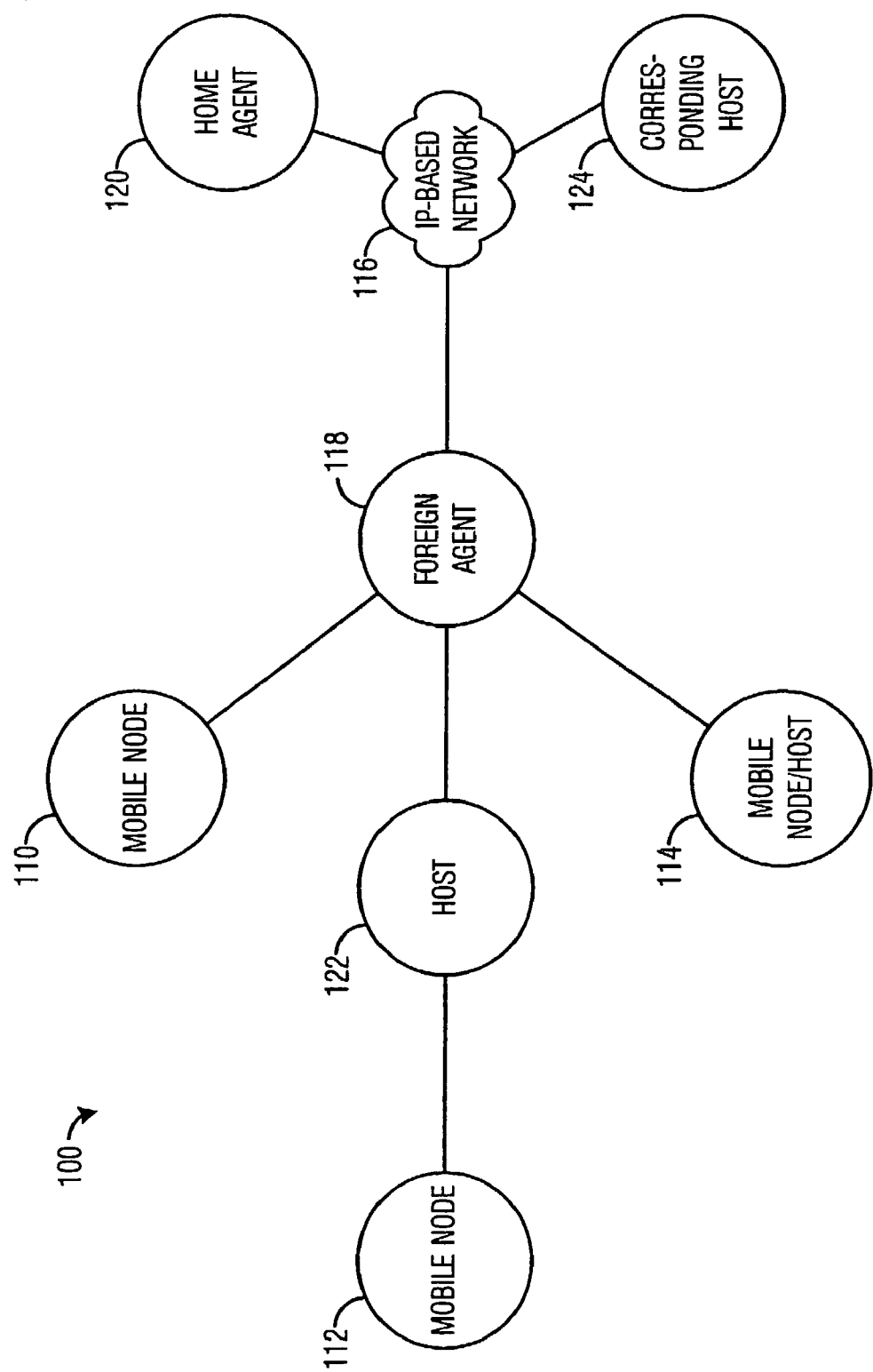
FIG. 1 schematically depicts a typical network environment that embodies features of the present invention.

Referring to FIG. 1 of the drawings, the reference numeral 100 generally depicts a communications system that embodies features of the present invention. Generally, a user (not shown) of a mobile node 110, 112, and/or 114, is connected for wireless or wireline access to an IP-based network 116, such as the Internet and the like, for purposes of communicating with a corresponding host 124 via a foreign agent 118 and/or a home agent 120. Generally, the foreign agent 118 and the home agent 120 comprise a router in a user's visited network and a user's home network, respectively. Additionally, the corresponding host 124 collectively refers to a host computer and an access device, such as another mobile node, a stationary device, and the like.

While FIG. 1 depicts a mobile node 110, 112, or 114 connected to the home agent 120 via a foreign agent 118 and an IP-based network 116, it is understood that the mobile node 110, 112, and 114 may connect directly to the home agent 120. Whether the mobile node 110, 112, and 114 connects to the home agent 120 and/or the foreign agent 118 depends upon, among other things, the location of the mobile node 110, 112, or 114. The process of connecting to the home agent 120 and/or the foreign agent 118 is well known to a person of ordinary skill in the art and, therefore, will not be discussed in greater detail except insofar as necessary to disclose the present invention.

A mobile node may connect to the home agent 120 and/or a foreign agent 118 in a number of ways as discussed below with respect to mobile nodes 110, 112, and 114. The mobile node 110 illustrates one scenario in which a mobile node 110, such as a laptop computer with a wireless modem and the like, connects to the home agent 120 and/or a foreign agent 118 via a wireline/wireless interface. Typically, the mobile node 110 connects to the home agent 120 and/or the foreign agent 118 without the interaction of a host or other third party.

Mobile node 112 illustrates another scenario in which the mobile node 112 connects to the home agent 120 and/or the foreign agent 118 via a host 122 and the IP-based network 116. For instance, some businesses, such as a host at a library, coffee shop, airport, and the like, allow a user (not shown) to connect a mobile node 112, such as the user's laptop, cell phone, PDA, and the like, to the business' server (i.e., the host 122). The host 122 provides the mobile node 112 access to the foreign agent 118 and the IP-based network 116 and, therefore, allows the mobile node 112 to communicate with the home agent 120.

In yet another scenario, the mobile node and host are combined, as depicted by the mobile node/host 114. Generally, in this scenario the user accesses the IP-based network 116 via the mobile node/host 114 of a third party and the foreign agent 118. For example, a coffee shop, an "Internet Cafe," a library, a shopping mall, and the like, may provide computer terminals or kiosks with an existing connection to the IP-based network 116 via the foreign agent 118. A user may then use these terminals or kiosks to access the home agent 120, gaining access to the user's information.

The interoperability of the components, such as the mobile nodes 110, 112, and 114, the home agent 120, and the foreign agent 118 are generally governed by standards created by various standards organizations and/or industry groups, such as the Internet Engineer Task Force's (IETF's) Request For Comments (RFC) 2002, and therefore, will not be discussed in greater detail except to the extent necessary to describe the present invention.

According to the RFC 2002 standards, the mobile node 110, 112, or 114 transmits a registration request (RRQ) message (not shown) to initiate services and may comprise any number of extensions. Generally, the RRQ message is transmitted with a Network Address Identifier (NAI) Extension, which identifies the user to the network according to the NAI included therein. The function and operation of the RRQ and the NAI Extension are well known to one of ordinary skill in the art and, therefore, will not be discussed in greater detail.

Figure 2:
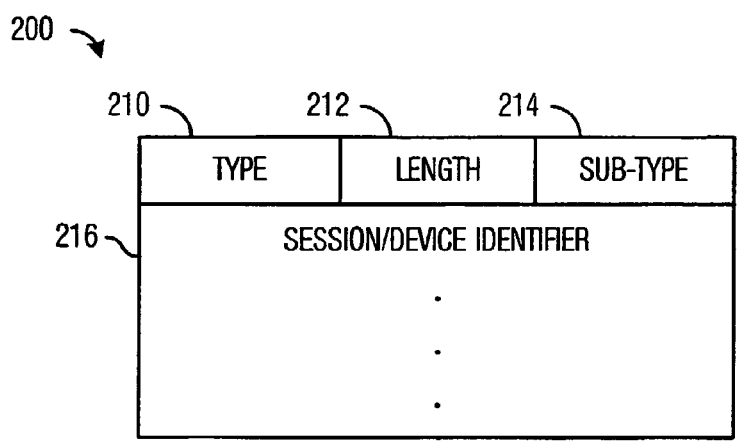
FIG. 2 is a message format exemplifying one embodiment of the Session/Device Identification Extension.
Figure 3:
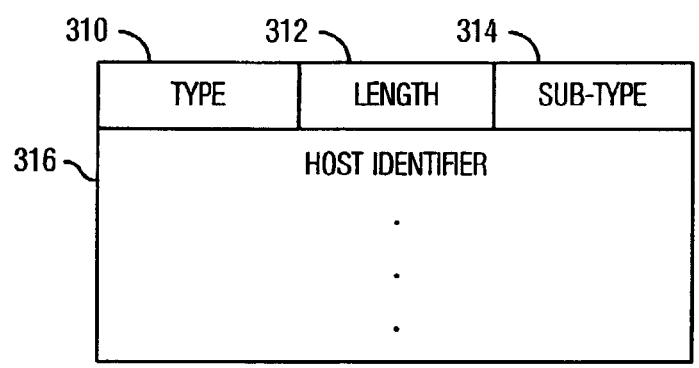
FIG. 3 is a message format exemplifying one embodiment of the Host Identification Extension.
Figure 4:
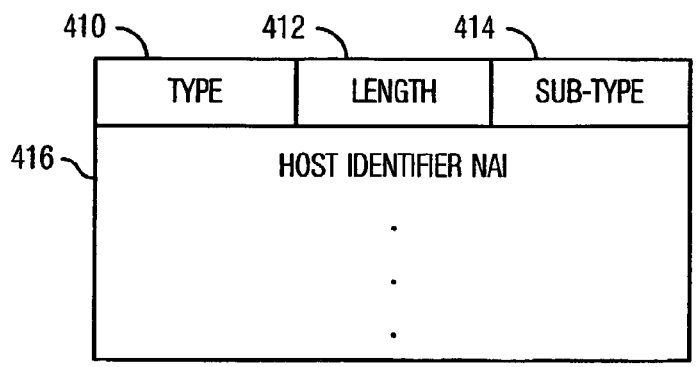
FIG. 4 is a message format exemplifying one embodiment of the Host NAI Identification Extension.

FIGS. 2-4 exemplify four additional extensions embodying features of the present invention, which are preferably appended to the RRQ message to allow mobile users to access the network from multiple devices using a single NAI and to allow hosts, such as service providers and/or device providers, to create different pricing plans to meet varying business goals. Preferably, the format of the extensions follows the short extension format defined by the IETF Internet Draft entitled "Mobile IP Extensions Rationalization (MIER)" ("MIER"), dated December 1999, available at the IETF Internet web page, Alternative formats, such as the long extension format disclosed in MIER above, the extension format specified by the IETF RFC 2002, entitled "IP Mobility Support," dated October 1996, available at the IETF Internet web page, and the like may also be used to convey the necessary information.

FIG. 2 exemplifies one embodiment of the present invention that provides an extension, generally referred to as a Session/Device Identifier (SDI) Extension 200, to allow mobile users access to an IP-based network 116 from one or more mobile nodes 110, 112, and 114 with a single NAI. By accessing an IP-based network 116 with a single NAI, the user may access communications and the like sent to the user's NAI from multiple devices. One embodiment allowing a home agent, or other component, to manage the communications with the multiple devices associated with a single NAI is discussed below in reference to FIG. 6.

The SDI Extension 200 generally comprises a type field 210, a length field 212, a sub-type field 214, and a SDI field 216. The type field 210 is preferably a one-byte value that indicates the category of extensions to which this extension belongs. The length field 212 is preferably a one-byte value that indicates the length, preferably in bytes, of the SDI field 216. The sub-type field 214 is a one-byte field that indicates that this extension is an SDI Extension. The SDI field 216 is preferably a variable length field that contains the device identifier of the particular mobile node 110, 112, and 114. Preferably, the SDI is a unique identifier statically assigned to a particular device. Additionally, the format of the SDI field 216 is preferably that defined for the "username" field in the IETF RFC 2486, entitled "The Network Access Identifier", by B. Aboda and M. Beadles, dated January 1999.

In operation, the SDI Extension 200 is sent as an extension with the RRQ message and NAI Extension. Upon receipt of the RRQ message, with any extensions, the home agent 120, or other network component such as the foreign agent 118, host 122, and the like, correlates the IP address, which is typically either contained in the RRQ message if the IP address is statically assigned or assigned by the home agent 120 if the IP address is dynamically assigned, to the NAI contained in the NAI Extension and to the session/device identifier contained in the SDI Extension. Once the NAI is associated to one or more sessions/devices, i.e., mobile nodes 110, 112, and 114, and an IF address, messages and/or communications sent to the NAI may be routed to the mobile nodes 110, 112, and 114 the user is currently using via the associated IP address.

Figure 5:
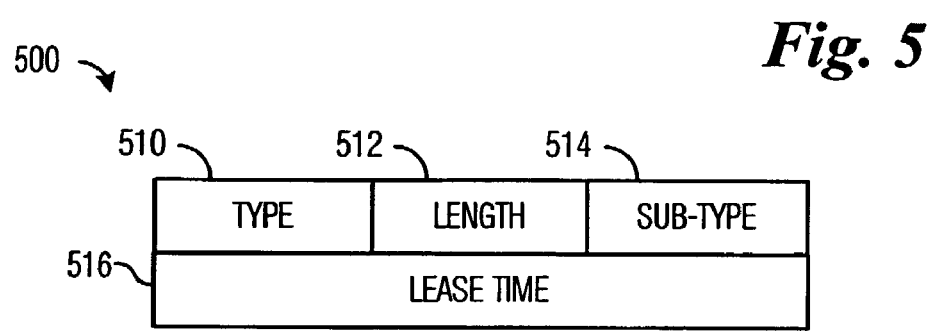
FIG. 5 is a message format exemplifying one embodiment of the Lease Time Extension.

FIGS. 3-5 exemplify extensions that allow businesses to create different business plans and arrangements. For instance, a business, such as a coffee shop, may provide access to a network via a network connection to which a user may connect his/her device, such as mobile node 112, or via a kiosk or terminal, such as mobile node/host 114. In either situation, a business may have a billing agreement or other agreement such that it is desirable to identify when a business, referred to as a host 122 or a mobile node/host 114, is connected to the foreign agent 118 and/or the home agent 120. This requires, however, a mechanism such as that illustrated in FIGS. 3-5 to identify the host, and possibly limit the use by the host.

FIGS. 3 and 4 exemplify alternative embodiments of the present invention that allow a host to identify itself to the foreign agent 118 and/or home agent 120, preferably as an extension to the RRQ message. Reference numeral 300, FIG. 3, generally designates a Host Identification Extension according to the present invention. The Host Identification Extension 300 generally comprises a type field 310, a length field 312, a sub-type field 314, and a host identifier field 316. The type field 310 is preferably a one-byte value that indicates the category of extensions to which this extension belongs. The length field 312 is preferably a one-byte value that indicates the length, preferably in bytes, of the host identifier field 316. The sub-type field 314 is a one-byte field that indicates that this extension is an SDI Extension. The host identifier field 316 is preferably a variable length field that identifies the host. Preferably, the format of the host identifier field 316 is that defined for the "realm" field in the IETF RFC 2486, entitled "The Network Access Identifier", by B. Aboda and M. Beadles, dated January 1999.

Referring to FIG. 4, reference numeral 400 generally designates a Host Identification NAI Extension according to the present invention. The Host Identification NAI Extension 400 generally comprises a type field 410, a length field 412, a sub-type field 414, and a host identifier NAI field 416. The type field 410 is preferably a one-byte value that indicates the category of extensions to which this extension belongs. The length field 412 is preferably a one-byte value that indicates the length, preferably in bytes, of the host NAI identifier field 416. The sub-type field 414 is a one-byte field that indicates that this extension is a Host Identification NAI extension. The host identifier NAI field 416 is preferably a variable length field that identifies the host by the host NAI. Preferably, the format of the host identifier NAI field 416 is that defined for the "nai" field in the IETF RFC 2486, entitled "The Network Access Identifier", by B. Aboda and M. Beadles, dated January 1999.

FIG. 5 exemplifies one embodiment of the present invention that may be used in conjunction with the Host Identification Extension (FIG. 3) and/or the Host Identification NAI Extension (FIG. 4) to allow the host to specify an amount of time for which the user is authorized to use the device, namely a Lease Time Extension 500. The Lease Time Extension 500 generally comprises a type field 510, a length field 512, a sub-type field 514, and a lease time field 516. The type field 510 is preferably a one-byte value that indicates the category of extensions to which this extension belongs. The length field 512 is preferably a one-byte value that indicates the length, preferably in bytes, of the lease time field 516. The sub-type field 514 is preferably a one-byte field that indicates that this extension is a Lease Time Extension. The lease time field 516 is preferably an 32-bit integer value representing the number of seconds, with 0xFFFFFFFF representing an infinite time, that the mobile node is authorized to be used.

Figure 6:
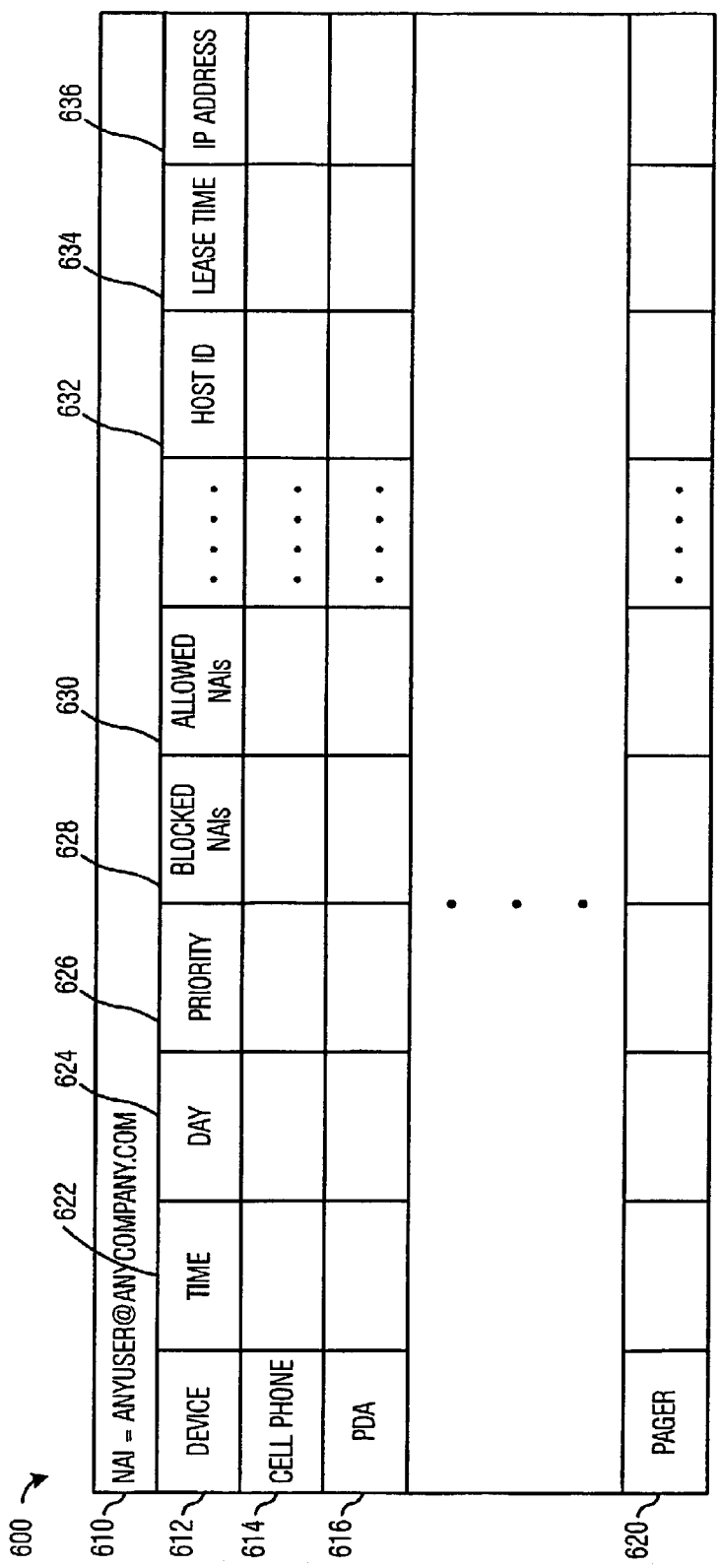
FIG. 6 is a table format exemplifying one embodiment of maintaining a list of active devices for an NAI.

FIG. 6 exemplifies one embodiment of the present invention that may be used in conjunction with the extensions referenced in FIGS. 2-5 to provide NAI profile management. The reference numeral 600 generally designates a preferred embodiment of an NAI profile management table. Preferably, the NAI profile management table 600 maintains a list of devices, i.e., mobile nodes 110, 112, and 114, that are active for any particular NAI. By doing so, a user is able to use multiple mobile nodes 110, 112, and 114 with a single NAI. Preferably, the NAI profile management table indicates the active mobile nodes 110, 112, and 114, such as a cell phone 614, a PDA 616, a pager 620, and the like, and associates the active devices with an IP address 636. For instance, the NAI profile management table 600 illustrates the ability to enter time 622 and day 624 restrictions for a device, a priority level 626 of a device, blocked NAIs that specify NAIs from which communications are not to be sent to the specified device, allowed NAIs 630 that specify NAIs from which communications are to be sent to the specified device, a host identifier 632, a lease time 634 for which the device is authorized for use, and the like. It is preferred that a user have the capability to modify and maintain the table via an online interface, such as a web page.

In accordance with the present invention, mobile nodes 110, 112, and/or 114 transmit the SDI Extension 200 as an extension to the RRQ message and, preferably, the NAI Extension. Upon receipt the foreign agent 118 and/or the home agent 120 enters the device into the NAI profile management table 600. Alternatively, the mobile nodes 110, 112, and/or 114 may already be listed in the NAI profile management table 600 and a field, such as an active field, (not shown) may be used to indicate when a particular device is active.

In addition to the SDI Extension 200, mobile nodes 110, 112, and/or 114 may also transmit the Host Identifier Extension 300 and/or the Host Identifier NAI Extension 400 to provide a host identification for business and or service purposes, such as service plans, billing arrangements, service features, and the like. Preferably, the host identification, such as that transmitted in the Host Identifier Extension 300 and/or the Host Identifier NAI Extension 400, is received by the foreign agent 118 and/or the home agent 120 and stored in the NAI profile management table 600, preferably in the Host ID field 632.

The mobile node user (not shown) also preferably has the ability to customize the interaction between devices through the NAI profile management table 600. The mobile node user may specify the times and days that a particular mobile node is preferred, as illustrated by the Time 622 and the Day 624 fields. The mobile node user also preferably has the ability to specify the relative priority of each device for use when multiple devices are active simultaneously through the use of the Priority field 626. Additionally, the Blocked NAIs field 628 and the Allowed NAIs field 630 provide the user a means to restrict and/or limit the communication to a particular device, such as wishing only to receive communications on the cell phone 614 from a particular person, like a spouse.

Preferably, the values of the NAI profile management table 600 are derived from one or more of standard default values for all mobile nodes, standard default values for a specific type of mobile nodes (such as all cell phones), default values for a particular mobile node user, and custom values assigned by a particular mobile node user. The standard default values for all mobile nodes preferably are determined by the service provider and are used when no other value is available, such as a custom value assigned by the mobile node user. Standard default values preferably are assigned to a type and/or types of devices, such as all cell phones, all wireless devices, and the like, and are assigned by the service provider. The default values for a particular mobile node user, or group of users, and custom values assigned by a particular mobile node user allow the mobile node user to personalize the values contained in the NAI profile management table 600. The default values for a particular mobile node user allow the user to assign default values for one or more mobile nodes 110, 112, and/or 114. Additionally, the mobile node user preferably has the ability to over-ride any default value by accessing the NAI profile management table 600, preferably via an on-line Internet web page, call-in service, and the like, and providing updated information.

It is understood that the present invention can take many forms and embodiments. Accordingly, several variations may be made in the foregoing without departing from the spirit or the scope of the invention.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

The invention claimed is:

1. A method for communicating with a user having a plurality of mobile nodes in an IP-based network, the method comprising the steps of:
receiving a registration request message from each of at least two of the plurality of mobile nodes, each of the registration request messages comprising a single Network Access Identifier, NAI, wherein the single NAI identifies the user to the IP-based network;
creating and maintaining a list of active mobile nodes associated with the single NAI;
selecting two or more mobile nodes from the list of active mobile nodes to which the one or more communications are to be sent, wherein the two or more mobile nodes are selected based upon at least one of active times, active days, a device identifier, an IP address, a device priority, a list of blocked NAIs, and a list of allowed NAIs; and
simultaneously sending one or more communications to two or more mobile nodes contained on the list of active mobile nodes.

2. The method of claim 1, wherein the step of receiving a registration request message further comprises the step of receiving a Session/Device Identification Extension uniquely identifying at least one of the one or more mobile nodes.

3. The method of claim 1, wherein the step of receiving a registration request message further comprises the step of receiving an indication of a host for at least one of the one or more mobile nodes.

4. The method of claim 1, wherein the step of receiving a registration request message further comprises the step of receiving an indication of a host for at least one of the one or more mobile nodes, the indication being a host identification extension comprising a host identifier.

5. The method of claim 1, wherein the step of receiving a registration request message further comprises the step of receiving an indication of a host for at least one of the one or more mobile nodes, the indication being a host identification extension comprising a host identifier NAI.

6. The method of claim 1, wherein the step of receiving a registration request message further comprises the step of receiving an indication of the length of time at least one of the one or more mobile nodes are authorized for use.

7. The method of claim 1, wherein the list of active mobile nodes comprises at least one of a device identifier, active times, active days, a device priority, a list of blocked NAIs, a list of allowed NAIs, and an IP address.

8. The method of claim 1, wherein the plurality of mobile nodes further comprises at least one fixed node.

9. The method of claim 1 further comprising, implementing a unified billing system, wherein a user is jointly billed for at least two of the plurality of mobile nodes.

10. The method of claim 1 further comprising, enabling a user to update characteristics for at least one mobile node through an IP-based network interface.

11. An apparatus for communicating with a user having a plurality of mobile nodes in an IP-based network, the apparatus comprising:
means for receiving a registration request message from each of at least two of the plurality of mobile nodes, each of the registration request messages comprising a single Network Access Identifier, NAI, wherein the single NAI identifies the user to the IP-based network;
means for creating and maintaining a list of active mobile nodes associated with the single NAI;
means for selecting two or more mobile nodes from the list of active mobile nodes to which the one or more communications are to be sent, wherein the two or more mobile nodes are selected based upon at least one of active times, active days, a device identifier, an IP address, a device priority, a list of blocked NAIs, and a list of allowed NAIs; and
means for sending one or more communications to two or more mobile nodes contained on the list of active mobile nodes.

12. The apparatus of claim 11, wherein the means for receiving a registration request message further comprises means for receiving a Session/Device Identification Extension uniquely identifying at least one of the one or more mobile nodes.

13. The apparatus of claim 11, wherein the means for receiving a registration request message further comprises means for receiving an indication of a host for at least one of the one or more mobile nodes.

14. The apparatus of claim 11, wherein the means for receiving a registration request message further comprises means for receiving an indication of a host for at least one of the one or more mobile nodes, the indication being a host identification extension comprising a host identifier.

15. The apparatus of claim 11, wherein the means for receiving a registration request message further comprises means for receiving an indication of a host for at least one of the one or more mobile nodes, the indication being a host identification extension comprising a host identifier NAI.

16. The apparatus of claim 11, wherein the means for receiving a registration request message further comprises means for receiving an indication of the length of time at least one of the one or more mobile nodes are authorized for use.

17. The apparatus of claim 11, wherein the list of active mobile nodes comprises at least one of a device identifier, active times, active days, a device priority, a list of blocked NAIs, a list of allowed NAIs, and an IP address.

18. The apparatus of claim 11, wherein the plurality of mobile nodes further comprises at least one fixed node.

19. The apparatus of claim 11 further comprising, means for implementing a unified billing system, wherein a user is jointly billed for at least two of the plurality of mobile nodes.

20. The apparatus of claim 11 further comprising, means for enabling a user to update characteristics for at least one mobile node through an IP-based network interface.

* * * * *